United States Patent
Yamamoto et al.

(10) Patent No.: US 9,471,667 B2
(45) Date of Patent: Oct. 18, 2016

(54) SYSTEMS AND METHODS FOR EVALUATING MULTILINGUAL TEXT SEQUENCES

(71) Applicant: Educational Testing Service, Princeton, NJ (US)

(72) Inventors: Kentaro Yamamoto, Lawrenceville, NJ (US); Jana Sukkarieh, Princeton, NJ (US); Matthias Von Davier, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 351 days.

(21) Appl. No.: 13/848,837

(22) Filed: Mar. 22, 2013

(65) Prior Publication Data

US 2013/0254216 A1     Sep. 26, 2013

Related U.S. Application Data

(60) Provisional application No. 61/615,513, filed on Mar. 26, 2012.

(51) Int. Cl.
| | |
|---|---|
| *G09B 3/02* | (2006.01) |
| *G06F 17/30* | (2006.01) |
| *G09B 7/02* | (2006.01) |
| *G09B 19/06* | (2006.01) |

(52) U.S. Cl.
CPC ........... *G06F 17/30663* (2013.01); *G09B 7/02* (2013.01); *G09B 19/06* (2013.01)

(58) Field of Classification Search
CPC ........................... G09B 7/02; G09B 17/30663
USPC ....................................................... 434/169
See application file for complete search history.

(56) References Cited

U.S. PATENT DOCUMENTS

| | | | | |
|---|---|---|---|---|
| 5,211,564 | A  * | 5/1993 | Martinez et al. | 434/323 |
| 7,059,860 | B2 * | 6/2006 | Linden-Henry | 434/178 |
| 2006/0286539 | A1* | 12/2006 | Tidwell-Scheuring | G09B 7/00 434/353 |
| 2009/0226872 | A1* | 9/2009 | Gunther | 434/350 |
| 2012/0064501 | A1* | 3/2012 | Sukkarieh | 434/353 |
| 2012/0303352 | A1* | 11/2012 | Coen | G06F 17/2854 704/2 |
| 2013/0212507 | A1* | 8/2013 | Fedoseyeva et al. | 715/765 |

OTHER PUBLICATIONS

MathIsFun.com. "Percentage Difference." Www.mathisfun.com. N.p., n.d. Web. Feb. 11, 2015.*
"String." Wordnik. N.p., n.d. Web. Feb. 18, 2015.*
"Substring." Wordnik. N.p., n.d. Web. Feb. 18, 2015.*

(Continued)

*Primary Examiner* — Robert Beausoliel, Jr.
*Assistant Examiner* — Arthur Ganger
(74) *Attorney, Agent, or Firm* — Jones Day

(57) ABSTRACT

Systems and methods are provided for scoring a response to a character-by-character highlighting task. A similarity value for the response is calculated by comparing the response to one or more correct responses to the task to determine the similarity or dissimilarity of the response to the one or more correct responses to the task. A threshold similarity value is calculated for the task, where the threshold similarity value is indicative of an amount of similarity or dissimilarity to the one or more correct responses required for the response to be scored at a certain level. The similarity value for the response is compared to the threshold similarity value. A score is assigned at, above, or below the certain level based on the comparison.

19 Claims, 14 Drawing Sheets

(56) References Cited

OTHER PUBLICATIONS

Pevzner, Pavel. Computational Molecular Biology: An Algorithmic Approach. Cambridge, MA: MIT, Nov. 2000.*

"Cap Cup Wedge Vee" in "Scientific Symbols and Icons" by Gérard P. Michon. Published Apr. 10, 2005, accessed Oct. 15, 2015 from <http://www.numericana.com/answer/symbol.htm>.*

Cormen, Thomas, Leiseron, Charles, Rivest, Ronald, Stein, Clifford; Introduction to Algorithms; The MIT Press: Cambridge, MA; 2001.

Hadlock, Frank; Minimum Detour Methods for String or Sequence Comparison; Congressus Numerantium, 61; pp. 263-274; 1988.

Hirschberg, Daniel; Algorithms for the Longest Common Subsequence Problem; Journal of the Association for Computing Machinery, 24(4); pp. 664-675; 1977.

Hirschberg, Daniel; A Linear Space Algorithm for Computing Maximal Common Subsequences; Communications of the ACM, 18(6); pp. 341-343; 1975.

Hunt, James, Szymanski, Thomas; A Fast Algorithm for Computing Longest Common Subsequences; Communications of the ACM, 20(5); pp. 350-353; 1977.

Iliopoulos, Costas; Rahman, M. Sohel; A New Efficient Algorithm for Computing the Longest Common Sequence; Theory of Computing Systems, 45(2); pp. 355-371; 2009.

Levenshtein, Vladimir; Binary Codes Capable of Correcting Deletions, Insertions, and Reversals; Soviet Physics Doklady, 10(8); pp. 707-710; 1966.

Masek, William, Paterson, Michael; A Faster Algorithm Computing String Edit Distances; Journal of Computer and System Sciences, 20; pp. 18-31; 1980.

Myers, Eugene; An O(ND) Difference Algorithm and Its Variations; Algorithmica, 1; pp. 251-266; 1986.

Nakatsu, Narao, Kambayashi, Yahiko, Yajima, Shuzo; A Longest Common Subsequence Algorithm Suitable for Similar Text Strings; Acta Informatica, 18(2); pp. 171-179; 1982.

Thang, Dang Quyet; Algorithm to Determine Longest Common Subsequences of Two Finite Languages; New Challenges for Intelligent Information and Database System, 351; Studies of Computational Intelligence; pp. 3-12; 2011.

Wagner, Robert, Fischer, Michael; A String-to-String Correction Problem; Journal of the Association for Computing Machinery, 22(1); pp. 168-173; 1974.

* cited by examiner

| Item 1 (English Version) | Item 1 (Spanish Version) |
|---|---|
| Stimulus: (a web page is given) | Stimulus: (un pagina web es suministrada) |
| Directions: Look at the web page. Highlight information on the page to answer the following question. | Indicaciones: Lee la pagina web. Resalte la informacion en la pagina que responda la siguiente pregunta. |
| Question: What does the web page say about the birth rate in USA in comparison to other countries? | Pregunta: ¿Que dice la pagina web sobre la tasa de natalidad en USA en comparacion con otros paises? |
| Minimum Response:<br>(1) Less than average<br>(2) Fell 4% between 2007-2009<br>(3) Fell 7% since 2007<br>(4) Low due to unfavorable economic conditions | Respuesta Minima:<br>(1) Mas que el promedio<br>(2) Cayo 4% entre 2007-2009<br>(3) Cayo 7% desde 2007<br>(4) Bajo debido a condiciones economicas desfavorables |
| Maximum Response:<br>Entire section starting with "How birth rate" and ending with "compared with others" | Respuesta Maxima:<br>La seccion comienza con "como el indice de natalidad" y termina con "comparada con otros" |
| Scoring Rule:<br>Score = (match(1) AND match(2) AND match(4)) OR (match(1) and match(3) AND match(4)) AND NOT mismatch(max$^C$) | Regla de calificacion:<br>Score = (match(1) AND match(2) AND match(4)) OR (match(1) and match(3) AND match(4)) AND NOT mismatch(max$^C$) |
| where max$^C$ is the complement of max (in terms of set theory) | donde max$^C$ es el complemento de max (en terminos de la teoria de conjuntos) |

102 — Stimulus
104 — Directions
106 — Question
108 — Minimum Response
110 — Maximum Response
112 — Scoring Rule

Fig. 1

| NAME | EXAMPLE |
|---|---|
| PREFIX-INSERTION | *By* less than average |
| PREFIX-OMISSION | *ss* than average |
| INFIX-INSERTION | N/A for this item type |
| INFIX-OMISSION | Fell 4% *betw* 2007-2009 |
| SUFFIX-INSERTION | Less than average *in comp* |
| SUFFIX-OMISSION | Less than *ave* |

Fig. 2

| Text1 | Text2 | LCS | Length* |
|---|---|---|---|
| Feliz Año Nuevo! Espero que todos estén muy bién. | Espero verles a todos. Hasta muy pronto. | Espero e todos st muy n. | 24 |
| ヨーロッパにおいて、職場でのストレスはわれわれが直面している安全衛生上最大の難問です。調査によれば、欠勤日全体の50%から60%がこれに関連していることを示唆しています。つまり、人の苦痛と経済活動の損失という両方の面から、膨大なコストがかかっているということです。」す | 欧州労働安全衛生機構 | 安全衛生 | 4 |

Fig. 3

| ITEM | FALSE (USING DISTINCT UNIFORM) | | TRUE (USING DISTINCT UNIFORM) | |
|---|---|---|---|---|
| | MIN-MAX | AVERAGE # OF GRAPHEMES IN RESPONSES | MIN-MAX | AVERAGE # OF GRAPHEMES IN RESPONSES |
| ENGLISH_1 | 76-2536 | 348.03 | 56-158 | 131.31 |
| ENGLISH_3 | 1-296 | 135.19 | 3-54 | 28.5 |
| ENGLISH_2 | 34-863 | 124.26 | 38-38 | 38 |
| ENGLISH_4 | 7-528 | 132.57 | 29-262 | 98.49 |
| SPANISH_1 | 2-1708 | 455.59 | 44-136 | 86.5 |
| SPANISH_3 | 1-903 | 281.27 | 3-157 | 37.01 |
| SPANISH_2 | 6-248 | 73.93 | 48-96 | 72 |
| SPANISH_4 | 1-644 | 134.81 | 23-292 | 245.21 |
| FRENCH_1 | 20-1525 | 331.63 | 32-170 | 108.29 |
| FRENCH_3 | 1-1007 | 534.17 | 3-216 | 75.19 |
| FRENCH_2 | 2-657 | 104.87 | 48-96 | 81.37 |
| FRENCH_4 | 3-993 | 155.45 | 29-292 | 165.24 |
| JAPANESE_1 | 7-245 | 26.59 | 10-85 | 26.66 |
| JAPANESE_3 | 2-131 | 60.97 | 3-96 | 69.12 |
| JAPANESE_2 | 4-247 | 48.93 | 10-20 | 15.62 |
| JAPANESE_4 | 3-237 | 30.13 | 15-123 | 44.69 |

Fig. 8

|  | TOTAL | FALSE | NON-NULL FALSE | FDINSTINCT NON-NULL | FDINSTINCT NON-NULL UNIFORM | TRUE | TRUE DISTINCT | TRUE DISTINCT UNIFORM |
|---|---|---|---|---|---|---|---|---|
| ENGLISH_1 | 85 | 52 | 42 | 32 | 30 | 33 | 14 | 5 |
| ENGLISH_2 | 81 | 23 | 17 | 13 | 13 | 58 | 3 | 2 |
| ENGLISH_3 | 81 | 20 | 11 | 10 | 10 | 61 | 1 | 1 |
| ENGLISH_4 | 85 | 47 | 47 | 41 | 39 | 38 | 18 | 17 |
| SPANISH_1 | 94 | 70 | 44 | 34 | 32 | 24 | 9 | 4 |
| SPANISH_2 | 107 | 34 | 21 | 19 | 18 | 73 | 7 | 7 |
| SPANISH_3 | 101 | 38 | 9 | 8 | 8 | 63 | 2 | 2 |
| SPANISH_4 | 94 | 64 | 43 | 30 | 28 | 30 | 17 | 15 |
| FRENCH_1 | 244 | 164 | 108 | 85 | 82 | 80 | 29 | 27 |
| FRENCH_2 | 213 | 73 | 27 | 16 | 16 | 140 | 12 | 11 |
| FRENCH_3 | 216 | 71 | 19 | 15 | 15 | 145 | 5 | 5 |
| FRENCH_4 | 246 | 157 | 117 | 84 | 79 | 89 | 29 | 25 |
| JAPANESE_1 | 153 | 75 | 50 | 43 | 43 | 78 | 23 | 23 |
| JAPANESE_2 | 157 | 36 | 16 | 15 | 15 | 121 | 13 | 13 |
| JAPANESE_3 | 148 | 24 | 6 | 6 | 6 | 124 | 4 | 4 |
| JAPANESE_4 | 153 | 84 | 63 | 41 | 41 | 69 | 25 | 25 |

*Fig. 9*

|  | # NON-NULL FALSE RESPONSES | # FALSE CORRECTED, CORRECTLY, TO TRUE | # REMAINING FALSE BELIEVED CORRECT | DISS | $\tau$ | # FALSE CORRECTED, WRONGLY, TO TRUE, IF ANY GIVEN THE SELECTED $\tau$ |
|---|---|---|---|---|---|---|
| ENGLISH_1 | 42 | 3 | 0 | 23-66 | 0.19 | - |
| ENGLISH_2 | 17 | 0 | 0 | N/A | N/A | 0 |
| ENGLISH_3 | 11 | 7 | 0 | 2-9 | 0.09 | 0 |
| ENGLISH_4 | 47 | 0 | 0 | N/A | N/A | 0 |
| SPANISH_1 | 44 | 0 | 0 | N/A | N/A |  |
| SPANISH_2 | 21 | 1 | 0 | 2 | 0.2 | 0 |
| SPANISH_3 | 9 | 4 | 0 | 1-6 | 0.05 | 0 |
| SPANISH_4 | 47 | 15 | 0 | 7-39 | 0.01-0.2 | - |
| FRENCH_1 | 108 | 12 | 0(?) | 1-57 | 0.01-0.3 | - |
| FRENCH_2 | 27 | 3 | 0 | 1-10 | 0.06-0.14 | 0 |
| FRENCH_3 | 19 | 11 | 0 | 1-9 | 0.07 | 0 |
| FRENCH_4 | 117 | 0 | 0 | N/A | N/A | 0 |

Fig. 10

SYSTEMS AND METHODS FOR EVALUATING MULTILINGUAL TEXT SEQUENCES

CROSS-REFERENCE TO RELATED APPLICATIONS

This application claims priority to U.S. Provisional Patent Application No. 61/615,513, filed Mar. 26, 2012, entitled "Systems and Methods for Evaluating Multilingual Text Sequences," which is herein incorporated by reference in its entirety.

TECHNICAL FIELD

The technology described herein relates generally to automated scoring of test-taker responses and more particularly to systems and methods for performing automated scoring of a multilingual, character-by-character highlighting item type.

BACKGROUND

Automated scoring systems may be used to automatically score a variety of different item types without a need for human intervention or requiring only limited human intervention. These systems may be configured to automatically evaluate, for example, multiple choice responses, essay responses, speech sample responses, and other types of responses elicited by a test prompt. Automated scoring systems may be used to mitigate time, cost, and reliability issues that may be inherent in human scoring systems. Notwithstanding these issues in human scoring systems, it may be desirable in certain situations for automated scoring systems to produce scores that are consistent with scores assessed by human graders. Thus, in certain situations, operation of an automated scoring system may be modified to add a level of scoring flexibility consistent with human graders' scoring methods.

SUMMARY

The present disclosure is directed to systems and methods for scoring a response to a character-by-character highlighting task. In a method for scoring a response to a character-by-character highlighting task, a similarity value for the response is calculated by comparing the response to one or more correct responses to the task to determine the similarity or dissimilarity of the response to the one or more correct responses to the task. A threshold similarity value is calculated for the task, where the threshold similarity value is indicative of an amount of similarity or dissimilarity to the one or more correct responses required for the response to be scored at a certain level. The similarity value for the response is compared to the threshold similarity value. A score is assigned at, above, or below the certain level based on the comparison.

A system for scoring a response to a character-by-character highlighting task includes one or more processors and one or more non-transitory computer-readable storage mediums containing instructions configured to cause the one or more processors to perform operations. The operations include calculating a similarity value for the response, where the similarity value is calculated by comparing the response to one or more correct responses to the task to determine the similarity or dissimilarity of the response to the one or more correct responses to the task. The operations also include calculating a threshold similarity value for the task, where the threshold similarity value is indicative of an amount of similarity or dissimilarity to the one or more correct responses required for the response to be scored at a certain level. The similarity value for the response is compared to the threshold similarity value. A score is assigned at, above, or below the certain level based on the comparison.

A non-transitory computer program product for scoring a response to a character-by-character highlighting task, tangibly embodied in a machine-readable non-transitory storage medium, includes instructions configured to cause a data processing system to calculate a similarity value for the response. The similarity value is calculated by comparing the response to one or more correct responses to the task to determine the similarity or dissimilarity of the response to the one or more correct responses to the task. The instructions are further configured to cause the data processing system to calculate a threshold similarity value for the task, where the threshold similarity value is indicative of an amount of similarity or dissimilarity to the one or more correct responses required for the response to be scored at a certain level. The similarity value for the response is compared to the threshold similarity value. A score is assigned at, above, or below the certain level based on the comparison.

BRIEF DESCRIPTION OF THE FIGURES

FIG. 1 is an example of a character-by-character highlighting item type.

FIG. 2 is a table listing examples of insertions and omissions that may be included in a test-taker's response to a highlighting item type question.

FIG. 3 is a table illustrating examples of text string pairs and their corresponding longest common subsequences.

FIG. 8 is a table summarizing a range of number of characters and an average number of characters for each item type of an example experiment.

FIG. 9 is a table listing statistics for items of an example experiment.

FIG. 10 is a table listing threshold values calculated for an example experiment.

DETAILED DESCRIPTION

Figure 4:
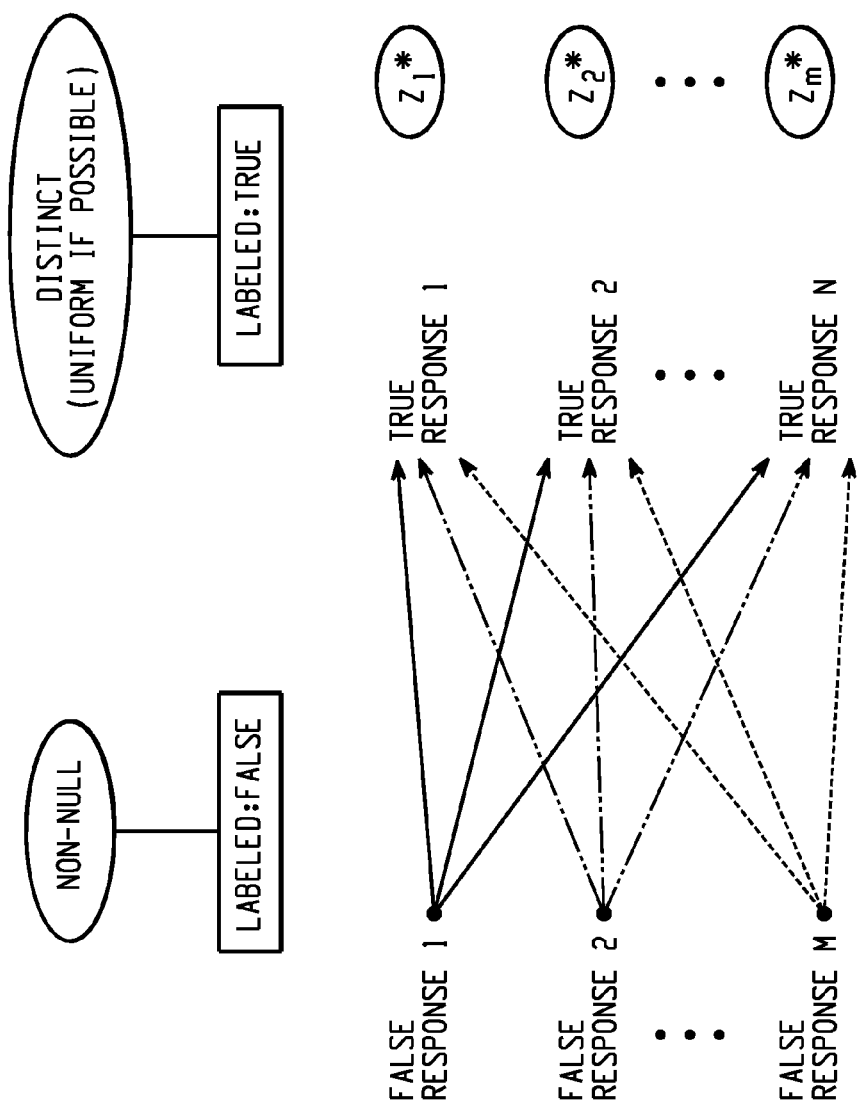
FIG. 4 depicts a comparison between each response automatically labeled as FALSE and each TRUE response for an example.

Automated content scoring systems may be used to automatically score a variety of different item types. These item types may include non-multiple-choice item types that elicit test-taker-produced responses (e.g., short written answers, essays, and recorded speech) or that require the test-taker to perform a task using a given stimulus. One such item type requiring the test-taker to perform a task is the multilingual, character-by-character highlighting item type. For this item type, a test taker is given a stimulus and directions to highlight "evidence" in the stimulus to respond to a prompt. A highlighting response may be assessed a binary score of TRUE or FALSE or a numerical score, with the score being based on whether the test-taker highlighted an amount of correct material in the stimulus and/or avoided highlighting an amount of incorrect material. FIG. 1 is an example of a character-by-character highlighting item type. In the example of FIG. 1, a test-taker is provided a web page as a stimulus 102 and asked to highlight information 104 on the web page to answer a prompt 106. In the example of FIG. 1, the test-taker is asked to highlight information on the web page that concerns a birth rate in the United States in comparison to other countries 106.

For the highlighting item type, a range of responses warranting a score of TRUE may be bound by a minimum evidence correct response and a maximum evidence correct response. Seen as a set of tokens, all correct responses are subsets of the maximum evidence response. The complement of the maximum evidence response may be considered "unacceptable" (e.g., material that should not be highlighted). With reference again to FIG. 1, four pieces of evidence may constitute minimum evidence for a correct response 108, and a maximum evidence correct response may consist of an entire section that encompasses the minimum 110.

An automated scoring system configured to score the character-by-character highlighting item type may utilize propositional logical formulae defined by match predicates (e.g., properly highlighting text that should be highlighted) and mismatch predicates (e.g., improperly highlighting text that should not be highlighted). A scoring rule for the automated scoring system may be a function based on a combination of match predicates and mismatch predicates where a match predicate, P, is TRUE if and only if P is completely highlighted, and a mismatch predicate, Q, is TRUE if and only if any part of Q (any token) is highlighted. An example scoring rule is illustrated at 112 of FIG. 1.

Conventional automated scoring systems which lack use of a human scorer may produce inappropriate scores when using the combination of match predicates and mismatch predicates. In particular, inappropriate scores may be assessed when an otherwise correct response includes certain additional, incorrect tokens or excludes certain correct tokens, causing the automated scoring system to label the response as FALSE. For example, if a correct response consists of the words "circulatory system," an automated scoring system operating under the logical formulae defined above may score as FALSE the following highlighted responses: "and the circulatory system" and "circulatory sys." Both of these responses, if evaluated by a human rater, may be seen as deserving of a TRUE score, despite the responses' inclusion of incorrect material or exclusion of correct material, respectively.

FIG. 2 is a table listing examples of insertions and omissions that may be included in a test-taker's response to a highlighting item type question. For the highlighting item type, the test-taker may be given an ability to highlight tokens individually, but the test-taker may not be given an ability to highlight whole words or phrases at a time. This method of highlighting creates a possibility that the test taker's response may either include additional tokens at the beginning or end of a response (i.e., insertions) or exclude tokens at the beginning, middle, or end of a response (e.g., omissions). Examples of omissions include a response highlighting "ss than average" 204 (instead of "less than average") and "Fell 4% betw 2007-2009" 208 (instead of "Fell 4% between 2007-2009"). Examples of insertions include a response highlighting "By less than average" 202 (instead of "less than average"). Other examples of omissions and insertions are illustrated at 210 and 212 of FIG. 2. For each highlighted response, any combination of these possibilities may occur, similar to what may occur with a test-taker's written response (except that there can be no transposition in the highlighting item type, i.e., no cases where two tokens are interchanged—"cieling" versus "ceiling"—and no insertions in the middle of a response 206). As described above, scoring rules of a conventional automated scoring system may cause any of these responses to be scored as FALSE, despite an amount of correct material highlighted in each. Thus, it may be desirable to modify the conventional automated scoring system in order to "correct" certain responses that would otherwise be labeled as FALSE due to prefix-infix-suffix omissions and insertions.

An automated scoring system may be modified to address the prefix-infix-suffix omissions and insertions based on similarity measures. In particular, a similarity measure between a test-taker's response scored as FALSE and a TRUE response may be calculated. If the test-taker's response has a high similarity (i.e., a low dissimilarity) to the TRUE response, then the score of FALSE given to the test-taker's response may be inappropriate. A longest common subsequence (LCS) measure may be used as a similarity measure, where a similarity between two texts is defined based on a longest common subsequence between them. As explained in detail below, the longest common subsequence may be a longest set of characters that appears in sequential order in both the test-taker's response and in a TRUE response.

Using the LCS measure, the test-taker's response may be seen as consisting of a finite set of graphemes, where a grapheme is the smallest semantically distinguishing unit in a written natural language. Graphemes include alphabetic letters, Chinese characters, numerical digits, punctuation marks, and the individual symbols of any of the world's writing systems. A subsequence of a string S is a set of graphemes that appear in order in the direction of the writing or script of the language of the string (e.g., in Spanish or English from left to right, and in Arabic or Hebrew from right to left). A set of graphemes for a subsequence need not occur consecutively. In a string "Naya," the following are examples of subsequences: "na," "ay," "aa," "ya," "ny," "nay," and "nya." However, "an" and "aan" would not be subsequences of the string "Naya."

Given two strings, a common subsequence is one that appears in both, and a longest common subsequence (LCS) is the common subsequence that has a maximum size or length in terms of number of graphemes. For example, two strings "jjjsslpljlppjppslppspjljj" and "sjssspjjllpjsspppll-pps" have an LCS of "jsspjppjspppl," which has a size or length of 13. The size or length of the longest common subsequence may be used in determining the similarity between two responses. FIG. 3 is a table illustrating examples of text string pairs and their corresponding longest common subsequences.

A number of different algorithms may be used to determine a longest common subsequence and its length, including a recursive algorithm. In one example of a recursive algorithm, let $X=\langle x_1, x_2, \ldots, x_m \rangle$ and $Y=\langle y_1, y_2, \ldots, y_n \rangle$ be sequences, and let $Z=\langle z_1, z_2, \ldots, z_k \rangle$ be any longest common subsequence of X and Y. If $x_m=y_n$, then $z_k=x_m=y_n$, and $Z_{k-1}$ is an LCS of $X_{m-1}$ and $Y_{n-1}$. If $x_m \neq y_n$, then $z_k \neq x_m$, and Z is an LCS of $X_{m-1}$ and Y. If $z_k \neq y_n$ then Z is an LCS of X and $Y_{n-1}$.

Alternatively, a length of a longest common subsequence may be determined through a different recursive algorithm that does not require that all subsequences be produced. In one example of this recursive algorithm, it may be assumed that length(i, j) is the length of an LCS of sequences Xi and Yj:

$$\text{length}(i, j) = \begin{cases} 0 \text{ if } i = 0 \text{ or } j = 0 \\ \text{length}(i-1, j-1) + 1 \text{ if } i, j > 0 \text{ and } x_i = y_j \\ \max(\text{length}(i, j-1), \text{length}(i-1, j)) \text{ if } i, j > 0 \text{ and } x_i \neq y_j \end{cases}$$

Irrespective of the method used to calculate the LCS, a similarity and a dissimilarity between two responses, T1 and T2, each seen as a sequence of graphemes, may be defined as:

Similarity($T_1,T_2$)=Longest common subsequence of graphemes between $T_1$ and $T_2$ Dissimilarity($T_1,T_2$)=([$T_1$]−[Similarity($T_1,T_2$)])+ ([$T_2$]−[Similarity($T_1,T_2$)])

The similarity and dissimilarity between two responses T1 and T2 may be normalized by dividing by a total number of graphemes in both T1 and T2. Normalization may be used when the scoring system is to be used over a large number of responses, items, and natural languages. In the following equations for normalized similarity and normalized dissimilarity, the notation [T1] is used to denote a number of graphemes, excluding white spaces, in a sequence of graphemes T1:

$$N\text{Similarity}(T_1, T_2) = \frac{[\text{Similarity}(T_1, T_2)]}{[T_1] + [T_2]}$$

$$N\text{Dissimilarity}(T_1, T_2) = \frac{([T_1] - [\text{Similarity}(T_1, T_2)]) + ([T_2] - [\text{Similarity}(T_1, T_2)])}{[T_1] + [T_2]}$$

In the above equations, a lower dissimilarity measure is indicative of higher similarity between two responses.

Using an LCS, a length of the LCS, and similarity and dissimilarity values, responses that may otherwise be scored as FALSE by an automated scoring system may be corrected in appropriate cases. These cases may be defined as those in which a similarity measure between a TRUE response and a response automatically scored as FALSE exceeds a threshold similarity value. Alternatively, a FALSE score may also be corrected when a dissimilarity measure between a TRUE response and a response automatically scored as FALSE is less than a threshold dissimilarity. An algorithm to perform such correction may consider a set of non-null responses that were scored as FALSE (denoted by ResFALSE) and may consider a set of distinct responses that were scored as TRUE (denoted by ResTRUE), $\forall$ $xf_i \neq \emptyset$ such that $xf_i \in$ ResFalse & $\forall$ $yt_j$ such that $yt_j \in$ ResTrue, to calculate a 4-tuple:

$A_{ij}$=<LCS($xf_i,yt_j$),Length_of_LCS($xf_i,yt_j$),Dissimilarity ($xf_i,yt_j$),NDissimilarity($xf_i,yt_j$)>

Arguments of $A_{ij}$ may be denoted with <$a_{ij}$, $b_{ij}$, $c_{ij}$, $d_{ij}$>.

For each item, an m×n matrix, Z, may be produced where m is a number of non-null responses labeled automatically as FALSE and n is a number of distinct TRUE (uniform) responses:

$$\begin{pmatrix} A_{11} & \cdots & A_{1n} \\ \vdots & \ddots & \vdots \\ A_{m1} & \cdots & A_{mn} \end{pmatrix}$$

Matrix Z is populated by comparing each response automatically labeled as FALSE to each TRUE response and for each comparison, computing each value of 4-tuple $A_{ij}$. FIG. 4 illustrates comparisons made to populate matrix Z. In FIG. 4, $Z_t^*$ denotes row t in the Z matrix.

Figure 5:
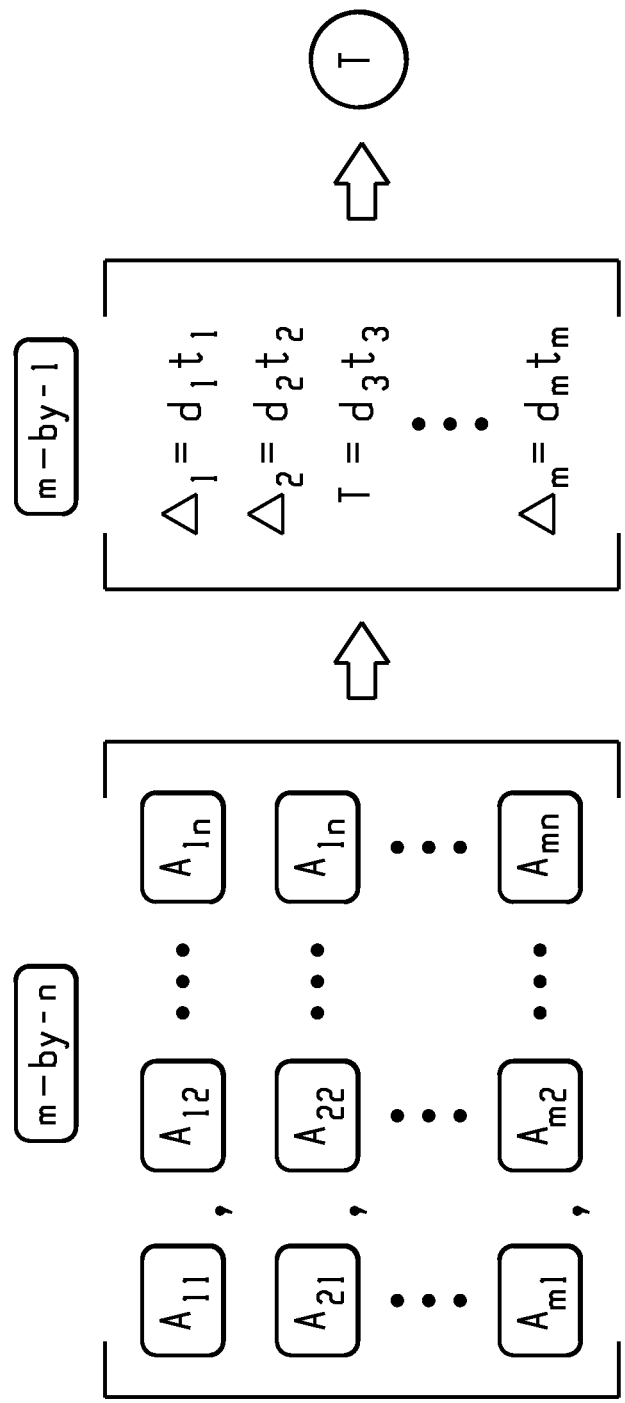
FIG. 5 illustrates a reduction of an m×n matrix to an m×1 column vector after calculating a minimum dissimilarity value for each of m responses automatically scored as FALSE for an example.

For the ith non-null response, a minimum dissimilarity, $\Delta_i=\min_j\{\text{NDissimilarity}(yt_j, xf_i)\}$, may be found. Alternatively, an algorithm may instead use a similarity measure, and a maximum similarity may be found. The minimum dissimilarity is the minimum $d_{ij}$ over all 4-tuples in row $Z_i^*$. Hence, $\Delta_i$ is of the form $d_{jk}$. As illustrated in FIG. 5, matrix Z's dimensions may be reduced to an m×1 column vector, where each entry represents a minimum dissimilarity $\Delta_i$ for each of the m responses labeled automatically as FALSE.

To determine whether a FALSE score should be corrected to TRUE based on the response's similarity or dissimilarity to a TRUE response, a threshold value may be calculated. For each item, a threshold for dissimilarity, $\Gamma$, may be determined, such that if $\exists$ $d_{ij} \leq \Gamma$, then the score of $xf_i$ is modified to TRUE. One method for calculating the threshold is to set the threshold based on some statistics related to the number of graphemes over all responses, or the minimum and maximum correct responses, where the threshold selection is general across all items. Another option is to use a set of training data or field test data to guide a selection of the dissimilarity tolerance that can be applied on an unseen set of responses.

Figure 6:
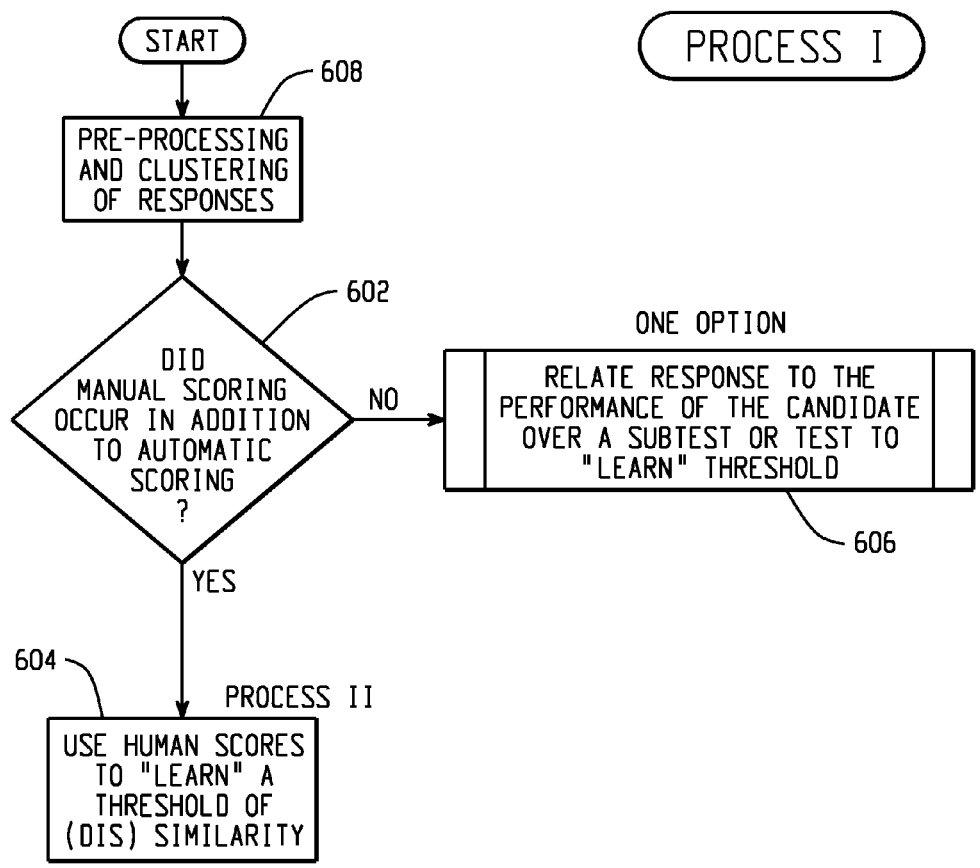
FIG. 6 is a flowchart illustrating an effect of human scoring on threshold selection.

FIG. 6 is a flowchart illustrating an effect of human scoring on threshold selection. The use of human scoring in addition to automatic scoring for a training dataset may have an impact on threshold selection 602. FIG. 6 illustrates that if human scores are given in addition to automatic scores for each item, the human scores may be used to "learn" a threshold of similarity or dissimilarity 604. If human scores are not used, then, for example, a one-to-one correspondence may be defined between a response produced by a candidate, C, and C's performance over a subtest of items belonging to a same stimulus or a whole test, in order to "learn" a threshold 606. Regardless of whether human scorers are used or not, a machine learning algorithm can be employed to learn a threshold given attributes such as LCS and dissimilarity, among others. Pre-processing and clustering steps 608 introduced in FIG. 6 are described in further detail below.

Figure 7:
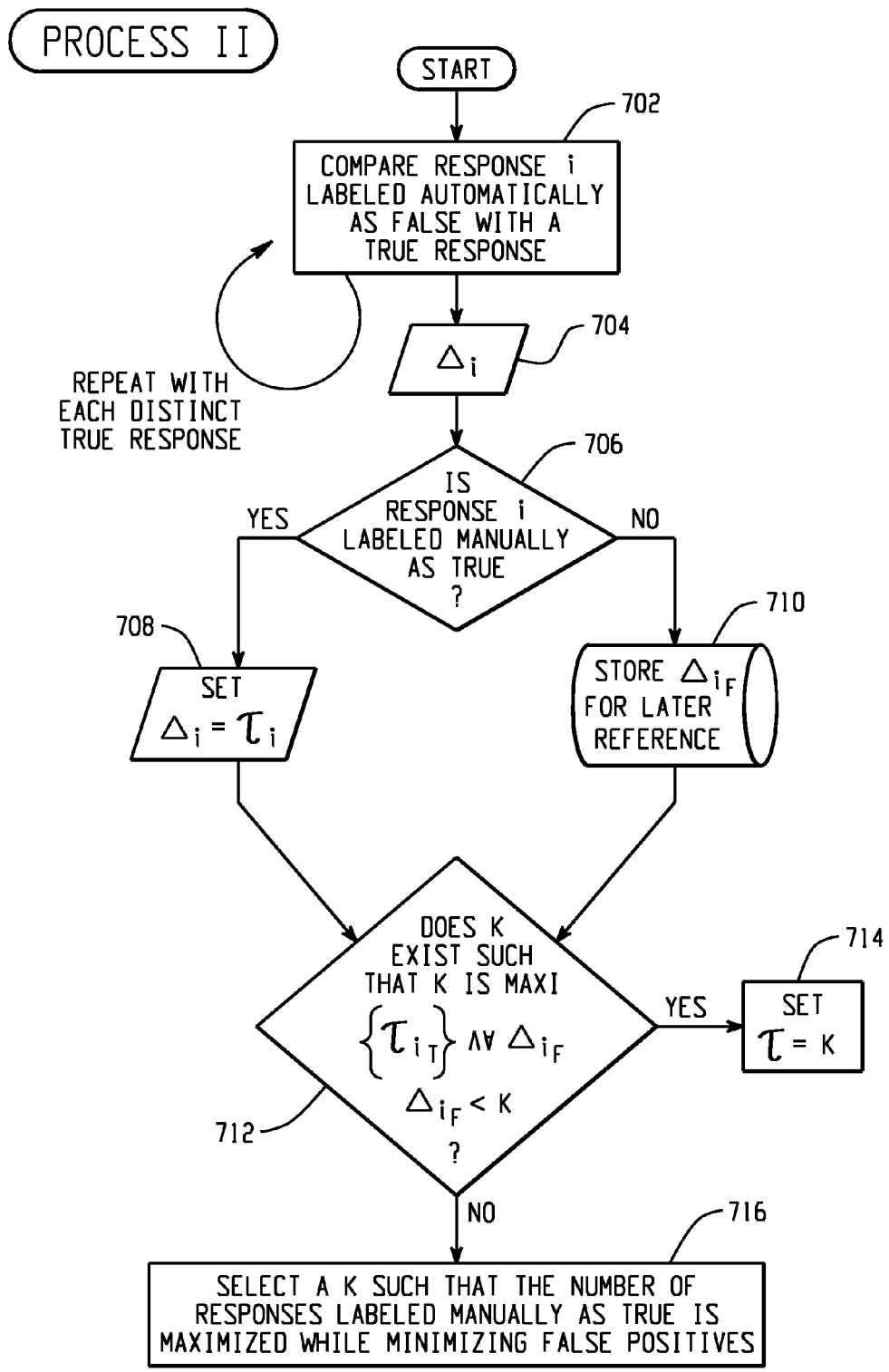
FIG. 7 is a flow diagram illustrating a method of selecting a dissimilarity threshold.

FIG. 7 is a flow diagram illustrating a method of selecting a dissimilarity threshold. Each response automatically labeled as FALSE is compared with each TRUE response 702 to produce a minimum dissimilarity $\Delta_i$ 704 for each response. A determination may be made at 706 as to whether $xf_i$ is scored manually as TRUE. If it is scored manually as TRUE, then $\Delta_i=\tau_i$ may be denoted 708, and if not, then $\Delta_i=\Delta_{iF}$ may be denoted and stored for later reference 710. A K may exist such that (K is $\max_i\{\Delta_{iT}\} \land \forall \Delta_{iF}. \Delta_{iF}<K$). If such a K exists, then the threshold $\Gamma$=K may be set 714. If such a K does not exist, then a $\Gamma$ may be selected such that a number of responses labeled manually as TRUE, where the automatic label will change from FALSE to TRUE, will be maximized while minimizing a number of false positives, i.e., responses labeled manually as FALSE that should not be rescored as TRUE 716.

The algorithms presented above, utilizing the LCS measure, may be designed to be general solutions that can be used with a variety of different item types. Alternatively, certain algorithms may be used that are less general and more targeted to use with the highlighting item type described above. One such algorithm utilizes a difference in a number of characters between a test-taker's response and a TRUE response and does not account for similarity or dissimilarity between the responses. This approach compares a length of a non-null FALSE Response, FR, to a length of each TRUE Response, TR:

$$\text{Normalized Difference} = \frac{abs([FR] - [TR])}{[FR] + [TR]}$$

This algorithm may be used in the following example, where it may be acceptable to correct the FALSE response into a TRUE:

FALSE Response: Sci discover t world that exists; engineers create the world that nev TRUE Response: scientists discover the world that exists $$\text{Normalized Difference} = \frac{abs(69 - 42)}{[69] + [42]} = 0.24$$

Another algorithm targeted to the highlighting item type is based on a longest common substring. In this algorithm, a substring may be considered, rather than a subsequence:

Similarity($yt_j, xf_i$)=Longest common substring of characters between $yt_j$ and $xf_i$ The difference between a substring and a subsequence is that in the substring, only consecutive characters are considered and not just characters in the direction of writing of the language.

Implementing the systems and methods disclosed herein may involve a number of steps. For example, pre-processing steps may include a) finding all responses labeled automatically as FALSE, b) finding all responses labeled automatically as TRUE (and any TRUE responses if access to the minimum and maximum is provided), c) filtering out all NULL responses labeled as FALSE, and d) considering only distinct TRUE responses and transforming them to a uniform representation (e.g., with no punctuation and no spaces). For consistency and efficiency, non-NULL responses labeled as FALSE may also be transformed to a uniform representation if the process was applied for TRUE responses. Further, results for each pair Text1/$xf_i$, Text2/$yt_j$, LCS, Length, Dissimilarity, NDissimilarity can be stored in a database in order to avoid recalculating for the same pair of texts multiple times.

The aforementioned pre-processing steps may have either constant runtimes or linear runtimes that are a function of the number of responses labeled as TRUE or FALSE. Hence, these pre-processing steps may be ignored when seeking to minimize runtime. Also, once the M×N matrix is produced, calculating $\Delta_i$ and selecting the threshold may also take a constant amount of time. Thus, the runtime of calculating the matrix, in the worst case scenario, may be defined as:

$F(Z)=M \times N \ O(LCS(T_i, T_j))$ where $i=1,2,\ldots,m$ and $j=1,2,\ldots,n$.

When seeking to optimize runtime, the time required for a process of comparing two texts, i.e., finding a longest common subsequence, may be most important.

One method of finding the longest common subsequence is the recursive method described above. If the recursive method is implemented by calculating all subsequences and then selecting the longest, its runtime in the worst-case scenario may be an exponential function of the number of characters in the two texts. If the recursive method is implemented with a dynamic algorithm or using memorization, then it may have an O(n×m) worst-case running time, where n and m are the number of graphemes in each sequence, and a worst case space requirement that is a quadratic function. Alternative algorithms may be used to reduce space requirements to O(n+m) and $$(O(n+m)) \text{ and } O\left(\frac{n \times m}{\log n + m}\right).$$

Further, other algorithms may be used that present complexities that depend on parameters other than m and n. For example, an algorithm with O((n+m) D) may be used, where D is a simple Levenshtein distance between two given strings. Alternatively, an algorithm with O((n+m) R) may be used where R is a total number of ordered pairs of positions at which two sequences match. Further, if two sequences belong to two finite languages accepted by two finite automata A1 and A2, then an algorithm of finding a longest common subsequence may have O(|A$_1$| |A$_2$|) worst-case running time, where |A$_i$| is a number of states and edges of automata A$_i$.

In an example experiment, a dynamic recursive algorithm was implemented in a Prolog programming language (SWI-Prolog) with quadratic time and quadratic space requirements. Graphemes were transformed to Unicode (utf8) representation to make the implementation natural language-independent. In the example experiment, highlighting items were written in English, Spanish, French, and Japanese languages. FIG. 8 is a table summarizing a range of number of characters and an average number of characters for each item type of the example experiment.

FIG. 9 is a table listing statistics for items of the example experiment. In FIG. 9, columns are as follows: total number of responses for each item 902, number of responses scored as FALSE 904, number of non-null responses scored as FALSE 906, number of non-null distinct responses scored as FALSE 908, number of non-null distinct responses scored as FALSE represented in a uniform way (i.e., with no punctuations and no spaces) 910, number of TRUE responses 912, number of TRUE distinct responses 914, and number of TRUE distinct responses represented in a uniform way 916.

FIG. 10 is a table listing threshold values 1002 calculated for the example experiment. For the example experiment, a human rater re-scored responses labeled as FALSE. Using this human re-scoring, a threshold dissimilarity 1002 was calculated comprising a minimum dissimilarity configured to maximize a number of FALSE responses corrected, correctly, to TRUE 1004. For each item, the number of FALSE responses that were correctly transformed into TRUE responses 1004 and a number of FALSE responses that were corrected wrongly to TRUE responses after selecting the threshold 1006 were calculated. The threshold τ was selected based on the algorithms illustrated in FIGS. 6 and 7, given the human scores. The results for each pair (e.g., Text1/xf$_i$, Text2/yt$_j$, LCS, Length, Dissimilarity, NDissimilarity) were stored in a database in order to avoid re-calculating for the same pair of sequences.

The systems and methods disclosed herein may also be used to cluster responses scored as FALSE based on their similarity or dissimilarity among one another and/or their similarity or dissimilarity with TRUE responses. Clustering may be used to refine test items, scoring rubrics, and/or scoring rules. A non-trivial number of similar responses within a same language or across languages may indicate how test-takers are interpreting prompts and whether there is any enhancement that can be performed on scoring guidelines. In the pre-processing steps described above, same or uniformly-represented responses may be identified and only one of the identified responses may be selected for consideration. By contrast, in a clustering step, similar responses may be clustered into equivalence classes, and a representative of each equivalence class may be considered.

Figure 11:
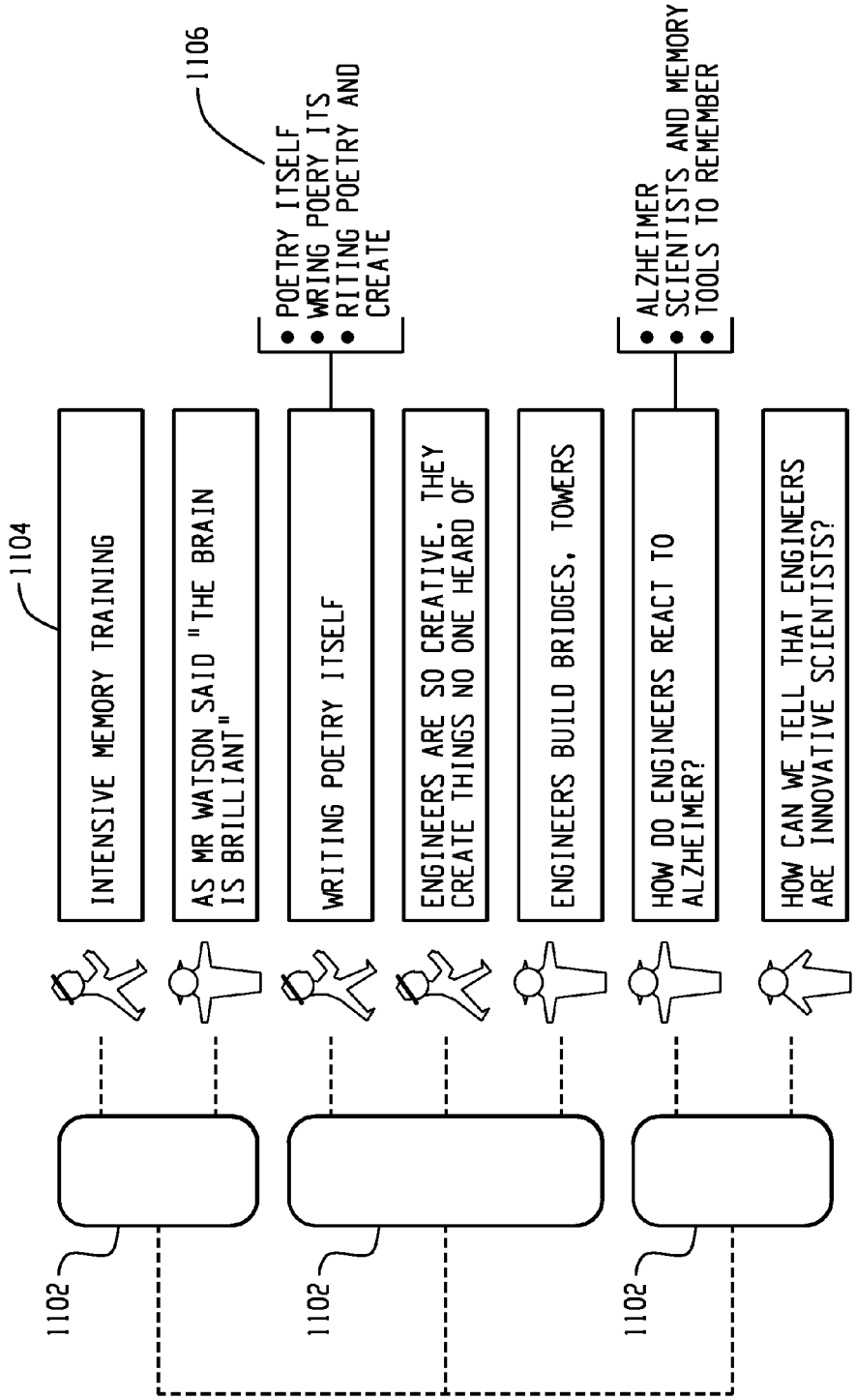
FIG. 11 is a diagram illustrating example clusters and subclusters for use with a clustering procedure.

FIG. 11 is a diagram illustrating example clusters 1102 and subclusters 1104 for use with a clustering procedure. In FIG. 11, there are three clusters 1102 and each cluster has a number of subclusters 1104. A first cluster may consist of TRUE responses and a second cluster may consist of FALSE responses. Text appearing in boxes in FIG. 11 are examples of representative responses for a cluster or equivalence class. In one example, software may allow a box to be clicked on to reveal a list of all responses for that cluster or equivalence class, as illustrated at 1106. A response may be included in an existing cluster or equivalence class or may be placed in a new cluster.

A number of specific issues may complicate scoring of character-by-character highlighting item types. For example, natural language translation-based issues may arise. Natural language translation-based issues may encompass situations where bias is introduced when translating from one language to another. Thus, test-takers responding in a particular language may be unintentionally favored over test-takers responding in a different language. These issues may primarily relate to selection of lexical entities (e.g., words, compounds, or multi-word tokens) by item developers. For example, ambiguities may be introduced when translating a passage from one language, L1, to a second language, L2, when a word that belongs to the minimum correct response is used in L2 in more than one position in the passage with the correct context, while in L1, different words are used or the same word with different implicit contexts is used. Further, translation of text from a first language to a second language may diminish nuances of language found in the text in the first language. This may occur in translating a passage from language L1 to language L2, when a word that belongs to the minimum correct response is used in L2 in more than one position in the passage that might reduce linguistic nuances (e.g., that may be used to reduce ambiguity) for students responding in L2. Translations that are correct, but in different forms may also unintentionally favor some students. For example, when translating numbers, "twenty" and "20," for example, are both correct translations in different forms, but a translation including one, rather than the other, may favor a certain group of students.

Another natural language translation-based issue relates to content word order. Although the English language utilizes a subject verb object (SVO) order, the most common order used in languages around the world is a subject object verb (SOV) order (e.g., Japanese uses SOV). Other orders are used in small percentages of languages: (e.g., VSO, VOS, OVS, OSV). The variability of different orders among languages may create issues because a content word such a verb or a noun (object or a subject) might appear in the minimum evidence response. For example, a minimum evidence response may be "electronic products" and a response may be "Japanese companies build electronic products smoothly and elegantly." When translated to Japanese, however, the words "electronic products" may not be positioned between "build" and "smoothly and elegantly" but rather located earlier so that a test-taker may highlight "build smoothly." Such a response may be scored as FALSE.

Highlighting beyond or off of a maximum may also cause issues in scoring. In some such cases, the incorrect highlighting may be due to a pure mechanical mistake (e.g., when a student seems to unintentionally add tokens and ends up with a response beyond the maximum). In other cases, the student's response may appear to be semantically legitimate, which may occur when a student highlights additional information either as a) a specific detail such as an illustration or an example confirming the correct response, or b) what appears to be a logical, coherent continuation of a correct response but not as specific as an illustration or an example. Finally, in other cases, the student's additional highlighting may be legitimately wrong, which may occur when a student highlights clearly wrong information (e.g., information that is incoherent with the maximum or the entire passage).

Similarly, highlighting that is of an inadequate amount may also cause issues in scoring. In some such cases, the lack of highlighting may be due to a pure mechanical mistake, as when test-taker omits tokens unintentionally. In other cases, the student's response may appear to be semantically legitimate, which may occur when an occurrence of a certain minimum in a certain position is not acceptable though it does not seem there is any contradictory or unsuitable content. Finally, in other cases, the student's lack of highlighting may be legitimately wrong (e.g., highlighting "stress" as a response to "How to train your memory?").

Scoring issues may also arise in situations where it is difficult to determine why an automated scoring system has given a particular score to a response. For example, some responses that are clearly correct may be given a FALSE label by an automated scoring system. Such responses may be detected quickly if there is one uniform representative labeled TRUE.

Further scoring issues may arise for items where a minimum includes a negation. Correct responses need not be coherent and need not be defined as a consecutive set of graphemes (e.g., if the passage contains "not concerned with the political issues created by greed," a minimum can be defined as "not concerned issues"). All of the above issues can be seen by looking at the data, and some of them can be inferred from a hierarchy of clusters (e.g., ranked in order). Clustering may be configured across similar issues and/or across similar languages.

Figure 12:
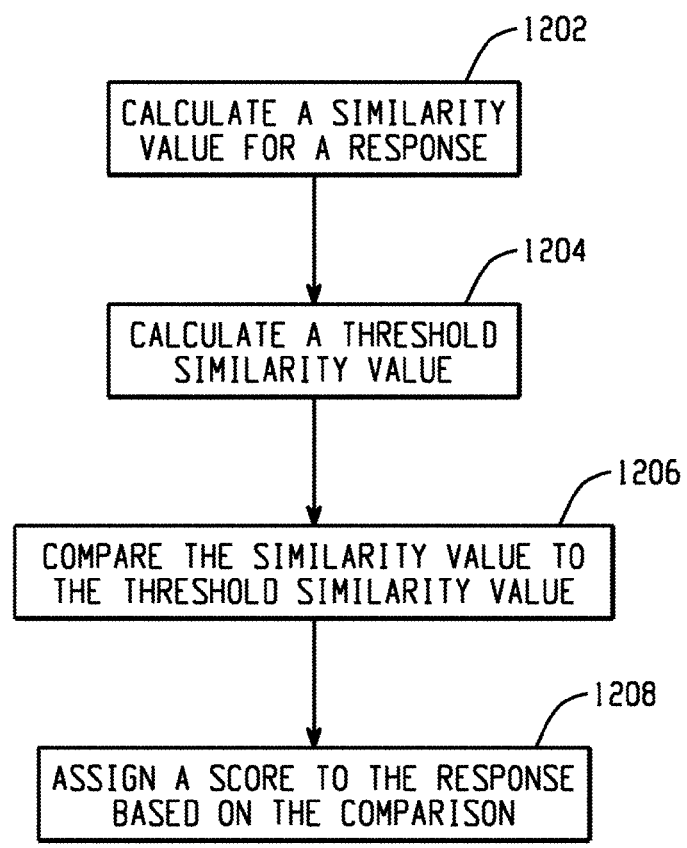
FIG. 12 is a flowchart illustrating a method of scoring a response to a character-by-character highlighting task.

FIG. 12 is a flowchart illustrating a method of scoring a response to a character-by-character highlighting task. At 1202, a similarity value is calculated for the response to the task, where the similarity value is calculated by comparing the response to one or more correct responses to the task to determine the similarity or dissimilarity of the response to the one or more correct responses to the task. At 1204, a threshold similarity value for the task is calculated. The threshold similarity value is indicative of an amount of similarity or dissimilarity to the one or more correct responses required for the response to be scored at a certain level. At 1206, the similarity value for the response is compared to the threshold similarity value. At 1208, a score is assigned to the response at, above, or below the certain level based on the comparing.

Figure 13A:
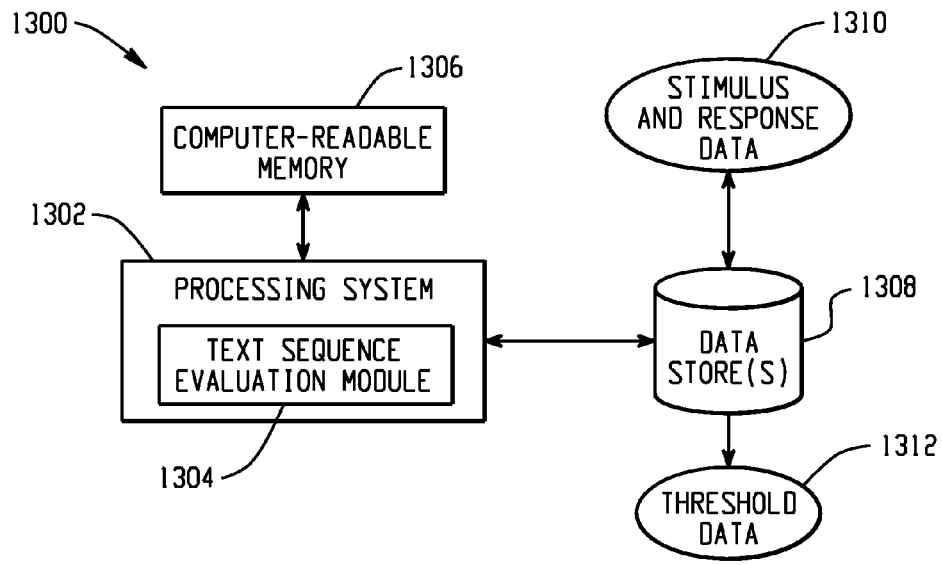
FIGS. 13A, 13B, and 13C depict example systems for use in implementing a method of evaluating multilingual text sequences.
Figure 13B:
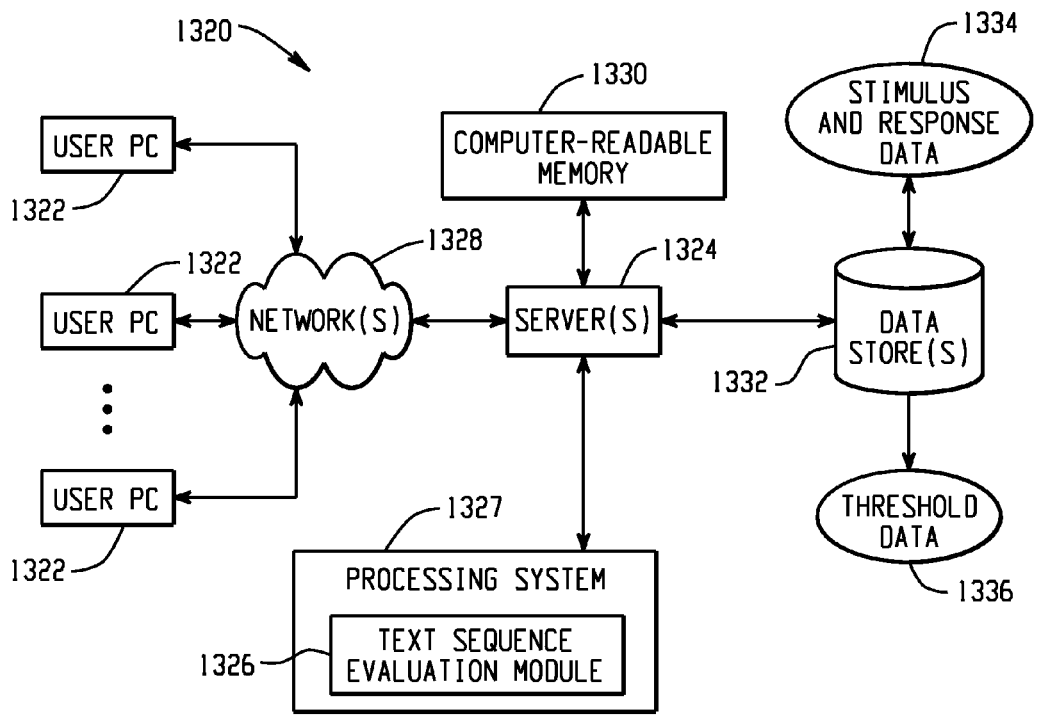
Figure 13C:
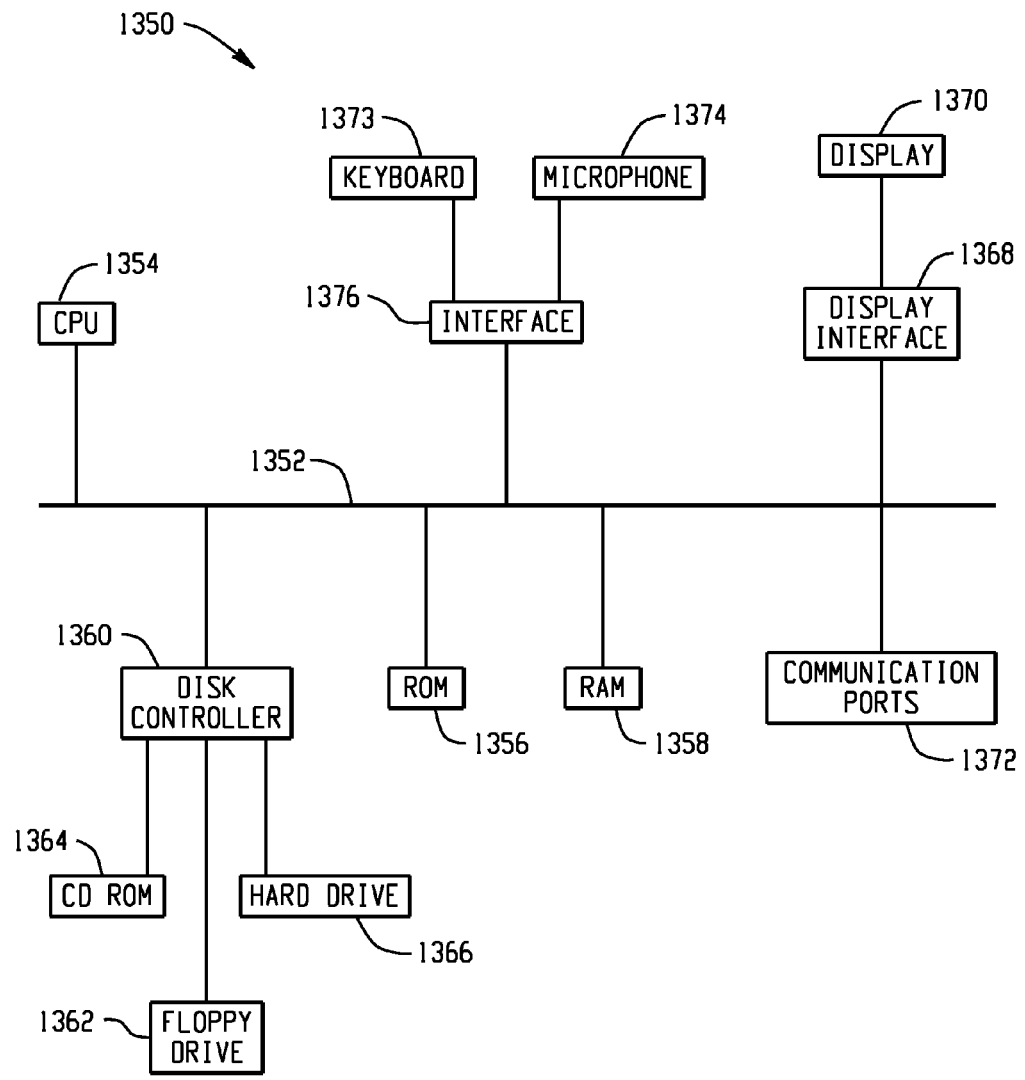

FIGS. 13A, 13B, and 13C depict example systems for use in implementing a method of evaluating multilingual text sequences. For example, FIG. 13A depicts an exemplary system 1300 that includes a standalone computer architecture where a processing system 1302 (e.g., one or more computer processors located in a given computer or in multiple computers that may be separate and distinct from one another) includes a text sequence evaluation module 1304 being executed on it. The processing system 1302 has access to a computer-readable memory 1306 in addition to one or more data stores 1308. The one or more data stores 1308 may include stimulus and response data 1310 as well as threshold data 1312.

FIG. 13B depicts a system 1320 that includes a client server architecture. One or more user PCs 1322 access one or more servers 1324 running a text sequence evaluation module 1326 on a processing system 1327 via one or more networks 1328. The one or more servers 1324 may access a computer readable memory 1330 as well as one or more data stores 1332. The one or more data stores 1332 may contain stimulus and response data 1334 as well as threshold data 1336.

FIG. 13C shows a block diagram of exemplary hardware for a standalone computer architecture 1350, such as the architecture depicted in FIG. 13A that may be used to contain and/or implement the program instructions of system embodiments of the present invention. A bus 1352 may serve as the information highway interconnecting the other illustrated components of the hardware. A processing system 1354 labeled CPU (central processing unit) (e.g., one or more computer processors at a given computer or at multiple computers), may perform calculations and logic operations required to execute a program. A non-transitory processor-readable storage medium, such as read only memory (ROM) 1356 and random access memory (RAM) 1358, may be in communication with the processing system 1354 and may contain one or more programming instructions for performing the method of evaluating multilingual text sequences. Optionally, program instructions may be stored on a non-transitory computer readable storage medium such as a magnetic disk, optical disk, recordable memory device, flash memory, or other physical storage medium.

A disk controller 1360 interfaces one or more optional disk drives to the system bus 1352. These disk drives may be external or internal floppy disk drives such as 1362, external or internal CD-ROM, CD-R, CD-RW or DVD drives such as 1364, or external or internal hard drives 1366. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1360, the ROM 1356 and/or the RAM 1358. Preferably, the processor 1354 may access each component as required.

A display interface 1368 may permit information from the bus 1352 to be displayed on a display 1370 in audio, graphic, or alphanumeric format. Communication with external devices may optionally occur using various communication ports 1372.

In addition to the standard computer-type components, the hardware may also include data input devices, such as a keyboard 1373, or other input device 1374, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A computer-implemented method of scoring a response to a character-by-character highlighting task, comprising:
   comparing, using a processing system, the response to the character-by-character highlighting task to a correct response to the task, the comparison generating a dissimilarity value that indicates an extent of a dissimilarity of the response and the correct response;

selecting, using the processing system, a threshold dissimilarity value for the task, the threshold dissimilarity value being based on (i) a first set of responses to the task, each response of the first set differing from the correct response and being scored by a human grader as being correct or incorrect, and (ii) a second set of responses to the task, each response of the second set being scored by a human grader as being correct, the threshold dissimilarity value being further based on filtering the first set to remove null responses from the first set;

comparing each response of the first set to each response of the second set, each comparison generating a dissimilarity value that is associated with the response of the first set, and populating a data structure comprising M×N dissimilarity values, where M is a number of non-null responses in the first set and N is a number of responses in the second set, M and N each being an integer that is greater than 1, for each response of the first set, determining a minimum dissimilarity value associated with the response from the data structure, and determining the threshold dissimilarity value further based on (i) the minimum dissimilarity values associated with the responses of the first set, and (ii) the scoring of the responses of the first set as being correct or incorrect by the human grader;

comparing, using the processing system, the dissimilarity value for the response to the threshold dissimilarity value; and scoring the response based on the comparing of the dissimilarity value for the response to the threshold dissimilarity value, wherein the response is scored as being correct if the dissimilarity value is less than or equal to the threshold dissimilarity value, and wherein the response is scored as being incorrect if the dissimilarity value is greater than the threshold dissimilarity value.

2. The computer-implemented method of claim 1, wherein the comparing of the response to the correct response includes comparing a sequence of characters in the response to a sequence of characters in the correct response.

3. The computer-implemented method of claim 1, wherein the dissimilarity value is based on a difference between a number of characters in the response and a number of characters in the correct response.

4. The computer-implemented method of claim 3, wherein the dissimilarity value is based on a normalized difference between the number of characters in the response and the number of characters in the correct response, the normalized difference being calculated based on $$\text{Normalized Difference} = \frac{\text{abs}([FR] - [TR])}{[FR] + [TR]},$$

where [FR] is the number of characters in the response, [TR] is the number of characters in the correct response, and abs([FR]−[TR]) is an absolute value of the difference between the number of characters in the response and the number of characters in the correct response.

5. The computer-implemented method of claim 1, wherein the dissimilarity value is based on a longest common subsequence, the longest common subsequence being a longest set of characters that appears in sequential order in both the response and the correct response.

6. The computer-implemented method of claim 5, wherein the longest common subsequence is calculated using a recursive algorithm.

7. The computer-implemented method of claim 1, wherein the dissimilarity value is determined based on $$([T_1]-[\text{Similarity}(T_1,T_2)])+([T_2]-[\text{Similarity}(T_1,T_2)]),$$

where $T_1$ and $T_2$ are the response and the correct response to the task, respectively, $[T_1]$ and $[T_2]$ are a number of graphemes in the response and the correct response to the task, respectively, and $[\text{Similarity}(T_1, T_2)]$ is a number of graphemes in a similarity value for the response, the similarity value being based on a longest set of characters that appears in sequential order in both the response and the correct response.

8. The computer-implemented method of claim 1, wherein the dissimilarity value is based on a longest common substring, the longest common substring being a longest set of characters that appears in sequential order in both the response and the correct response, wherein the longest set of characters are consecutive characters within the response and the correct response.

9. The computer-implemented method of claim 1, wherein the scoring of the response modifies a score previously assigned to the response.

10. The computer-implemented method of claim 9, wherein the scoring of the response modifies the score previously assigned to the response if the response has a high similarity to the correct response or a low dissimilarity to the correct response.

11. The computer-implemented method of claim 1, wherein the character-by-character highlighting task includes a stimulus that is given to a test-taker and directions to select portions of the stimulus to respond to a prompt.

12. The computer-implemented method of claim 1, wherein the threshold dissimilarity value is based on:

for each response i of the first set:
determining if the human grader scored the response i as being correct or incorrect,
based on a determination that the human grader scored the response i as being correct, setting a value $\tau i$ to be equal to the minimum dissimilarity value $\Delta_i$ for the response, and
based on a determination that the human grader scored the response i as being incorrect, setting a value $\Delta_{iF}$ to be equal to the minimum dissimilarity value $\Delta_i$ for the response;

determining if a value K exists where K is $\max_i\{\tau_i\} \wedge \nabla\Delta_{iF}$, and $\Delta_{iF}<K$, and $\wedge$ is a minimum function for determining a minimum of $\max_i\{\tau_i\}$ and $\nabla\Delta_{iF}$; and
based on a determination that the value K exists, setting the threshold dissimilarity value equal to the value K.

13. A system for scoring a response to a character-by-character highlighting task, comprising:
a processing system;

one or more non-transitory computer-readable storage mediums containing instructions configured to cause the processing system to perform operations including:

comparing the response to the character-by-character highlighting task to a correct response to the task, the comparison generating a dissimilarity value that indicates an extent of a dissimilarity of the response and the correct response;

selecting a threshold dissimilarity value for the task, the threshold dissimilarity value being based on (i) a first set of responses to the task, each response of the first set differing from the correct response and being scored by a human grader as being correct or incorrect, and (ii) a second set of responses to the task, each response of the second set being scored by a human grader as being correct, the threshold dissimilarity value being further based on filtering the first set to remove null responses from the first set;

comparing each response of the first set to each response of the second set, each comparison generating a dissimilarity value that is associated with the response of the first set, and populating a data structure comprising M×N dissimilarity values, where M is a number of non-null responses in the first set and N is a number of responses in the second set, M and N each being an integer that is greater than 1, for each response of the first set, determining a minimum dissimilarity value associated with the response from the data structure, and determining the threshold dissimilarity value further based on (i) the minimum dissimilarity values associated with the responses of the first set, and (ii) the scoring of the responses of the first set as being correct or incorrect by the human grader;

comparing the dissimilarity value for the response to the threshold dissimilarity value; and scoring the response based on the comparing of the dissimilarity value for the response to the threshold dissimilarity value, wherein the response is scored as being correct if the dissimilarity value is less than or equal to the threshold dissimilarity value, and wherein the response is scored as being incorrect if the dissimilarity value is greater than the threshold dissimilarity value.

14. The system of claim 13,
wherein the dissimilarity value is based on a longest common subsequence, the longest common subsequence being a longest set of characters that appears in sequential order in both the response and the correct response.

15. The system of claim 13,
wherein the scoring of the response modifies a score previously assigned to the response.

16. The system of claim 13, wherein the threshold dissimilarity value is based on:
for each response i of the first set:
determining if the human grader scored the response i as being correct or incorrect,
based on a determination that the human grader scored the response i as being correct, setting a value $\tau_i$ to be equal to the minimum dissimilarity value $\Delta_i$ for the response, and based on a determination that the human grader scored the response i as being incorrect, setting a value $\Delta_{iF}$ to be equal to the minimum dissimilarity value $\Delta_i$ for the response;

determining if a value K exists where K is $\max_i\{\tau_i\} \wedge \nabla\Delta_{iF}$, and $\Delta_{iF}<K$, and $\wedge$ is a minimum function for determining a minimum of $\max_i\{\tau_i\}$ and $\nabla\Delta_{iF}$; and based on a determination that the value K exists, setting the threshold dissimilarity value equal to the value K.

17. A non-transitory computer-readable storage medium for scoring a response to a character-by-character highlighting task, the computer-readable storage medium comprising computer executable instructions which, when executed, cause a processing system to execute steps comprising:

comparing the response to the character-by-character highlighting task to a correct response to the task, the comparison generating a dissimilarity value that indicates an extent of a dissimilarity of the response and the correct response;

selecting a threshold dissimilarity value for the task, the threshold dissimilarity value being based on (i) a first set of responses to the task, each response of the first set differing from the correct response and being scored by a human grader as being correct or incorrect, and (ii) a second set of responses to the task, each response of the second set being scored by a human grader as being correct, the threshold dissimilarity value being further based on filtering the first set to remove null responses from the first set;

comparing each response of the first set to each response of the second set, each comparison generating a dissimilarity value that is associated with the response of the first set, and populating a data structure comprising M×N dissimilarity values, where M is a number of non-null responses in the first set and N is a number of responses in the second set, M and N each being an integer that is greater than 1, for each response of the first set, determining a minimum dissimilarity value associated with the response from the data structure, and determining the threshold dissimilarity value further based on (i) the minimum dissimilarity values associated with the responses of the first set, and (ii) the scoring of the responses of the first set as being correct or incorrect by the human grader;

comparing the dissimilarity value for the response to the threshold dissimilarity value; and scoring the response based on the comparing of the dissimilarity value for the response to the threshold dissimilarity value, wherein the response is scored as being correct if the dissimilarity value is less than or equal to the threshold dissimilarity value, and wherein the response is scored as being incorrect if the dissimilarity value is greater than the threshold dissimilarity value.

18. The non-transitory computer-readable storage medium of claim 17, wherein the dissimilarity value is based on
a longest common subsequence, the longest common subsequence being a longest set of characters that appears in sequential order in both the response and the correct response.

19. The non-transitory computer-readable storage medium of claim 17, wherein the threshold dissimilarity value is based on:

for each response i of the first set:
  determining if the human grader scored the response i as being correct or incorrect,
  based on a determination that the human grader scored the response i as being correct, setting a value $\tau_i$ to be equal to the minimum dissimilarity value $\Delta_i$ for the response, and
  based on a determination that the human grader scored the response i as being incorrect, setting a value $\Delta_{iF}$ to be equal to the minimum dissimilarity value $\Delta_i$ for the response;
determining if a value K exists where K is $\max_i\{\tau_i\} \wedge \nabla\Delta_{iF}$, and $\Delta_{iF} < K$, and $\wedge$ is a minimum function for determining a minimum of $\max_i\{\tau_i\}$ and $\nabla\Delta_{iF}$; and
based on a determination that the value K exists, setting the threshold dissimilarity value equal to the value K.

* * * * *